(12) United States Patent
Foster et al.

(10) Patent No.: US 8,720,302 B2
(45) Date of Patent: May 13, 2014

(54) ANCHORING MEANS FOR THE SHEATH OF A BOWDEN CABLE

(75) Inventors: Graham Foster, Mumbles (GB); Adam Richards, Swansea (GB)

(73) Assignee: Hi-Lex Cable System Company Limited, Port Talbot (GB)

( * ) Notice: Subject to any disclaimer, the term of this patent is extended or adjusted under 35 U.S.C. 154(b) by 480 days.

(21) Appl. No.: 10/531,668

(22) PCT Filed: Oct. 2, 2003

(86) PCT No.: PCT/GB03/04280
§ 371 (c)(1),
(2), (4) Date: Sep. 1, 2005

(87) PCT Pub. No.: WO2004/036068
PCT Pub. Date: Apr. 29, 2004

(65) Prior Publication Data
US 2006/0110217 A1    May 25, 2006

(30) Foreign Application Priority Data
Oct. 15, 2002 (GB) .................................. 0223959.8

(51) Int. Cl.
*F16C 1/10* (2006.01)
*F16C 1/14* (2006.01)
*F16C 1/20* (2006.01)
*F16C 1/26* (2006.01)

(52) U.S. Cl.
USPC ......................................... 74/502.4; 74/502.6

(58) Field of Classification Search
USPC ........... 74/502.4, 502.6, 502, 501.5 R, 500.5, 74/502.5; 403/197, 238, 239, 288, 369, 403/325, 327; 16/2, 108; 248/56, 71, 248/223.41, 229.11, 230.2, 292.13
See application file for complete search history.

(56) References Cited

U.S. PATENT DOCUMENTS

| 3,631,738 A | 1/1972 | Harper |
| 4,074,945 A | 2/1978 | Kraus et al. |

(Continued)

FOREIGN PATENT DOCUMENTS

| DE | 2261933 A | 7/1974 |
| DE | 19528953 A | 2/1990 |

(Continued)

OTHER PUBLICATIONS

European Patent Office. http://epo.worldlingo.com/wl/epo/epo.html?ACTION=description-retrieval&COUNTRY=DE &FORMAT=docdb&KIND=A1&LOCALE=en_EP&NUMBER=2261933&OPS=ops.epo.org.*

*Primary Examiner* — Daniel Yabut
(74) *Attorney, Agent, or Firm* — Stites & Harbison PLLC; Richard S. Myers, Jr.

(57) ABSTRACT

An anchoring device for anchoring an elongate member to a fixed member having a slot leading to an edge thereof, wherein the elongate member passes through the slot; the anchoring device comprising a sleeve which is fixable coaxially around said elongate member and which is provided with a peripheral groove that has an axial length sufficient to accommodate the thickness of the fixed member at said slot and has an outer dimension being less than the inner dimension of the slot; the anchoring device further comprising a collar member which is carried by, and axially moveable along, said sleeve, said collar member having a leading edge which extends into said groove and engages the edge of the slot when the anchoring device is located within said slot, the collar member being arranged such that the leading edge of the collar is withdrawn from the groove by moving the collar member along the sleeve in an axial direction away from the slot.

12 Claims, 6 Drawing Sheets

(56) References Cited

U.S. PATENT DOCUMENTS

| | | | |
|---|---|---|---|
| 4,262,409 A | 4/1981 | Madej | |
| 4,304,148 A | 12/1981 | Hamman | |
| 4,324,503 A * | 4/1982 | Sevrence | 403/197 |
| 4,339,213 A | 7/1982 | Gilmore | |
| 5,015,023 A * | 5/1991 | Hall | 294/102.1 |
| 5,105,682 A | 4/1992 | Jung | |
| 5,280,733 A * | 1/1994 | Reasoner | 74/502.4 |
| 5,383,377 A * | 1/1995 | Boike | 74/502 |
| 5,461,938 A | 10/1995 | Froling et al. | |
| 5,579,662 A | 12/1996 | Reasoner | |
| 5,746,094 A * | 5/1998 | Medebach et al. | 74/502.4 |
| 6,019,014 A * | 2/2000 | Jenkins | 74/502.4 |
| 6,189,407 B1 * | 2/2001 | Champ et al. | 74/502.4 |
| 6,295,889 B1 * | 10/2001 | Jones | 74/502.4 |
| 6,499,909 B1 | 12/2002 | Scheidling et al. | |
| RE39,327 E * | 10/2006 | Reasoner | 74/502.4 |
| 2002/0053253 A1 * | 5/2002 | Burger | 74/502.6 |
| 2002/0189390 A1 * | 12/2002 | Mayville et al. | 74/502.6 |

FOREIGN PATENT DOCUMENTS

| | | |
|---|---|---|
| DE | 4024062 | 4/1992 |
| DE | 19840642 A | 3/2000 |
| DE | 19946372 A | 5/2000 |
| EP | 209249 A * | 1/1987 |
| EP | 0648948 | 1/1994 |
| EP | 0703395 A | 3/1996 |
| EP | 0889270 A | 7/1999 |
| EP | 1190185 | 6/2000 |
| EP | 1026411 A | 8/2000 |
| EP | 1114937 A1 | 7/2001 |
| FR | 2532381 | 3/1984 |
| GB | 1509287 | 5/1978 |
| GB | 1579840 | 11/1980 |
| GB | 2152273 A | 6/1985 |
| GB | 2346186 A | 1/1999 |
| JP | 11173322 A * | 6/1999 |
| JP | 2002122271 A * | 4/2002 |

\* cited by examiner

ANCHORING MEANS FOR THE SHEATH OF A BOWDEN CABLE

CROSS REFERENCE TO RELATED APPLICATIONS

Transmitted herewith for filing is a patent application claiming priority under 35 U.S.C. §371 of International Application No. PCT/GB2003/004280 filed on 2 Oct. 2003 claiming priority of Patent Application No. GB0223959.8 filed on 15 Oct. 2002.

BACKGROUND OF THE INVENTION

This invention relates to apparatus for use in anchoring an elongate member to another member and, more particularly, but not necessarily exclusively, to an abutment for use in anchoring a flexible control cable to fixed members of the chassis or bodywork of a vehicle.

A "push-pull" cable is a device for translating a push/pull movement at one location to a push/pull movement (in the same or any different direction) at a different location, often for control purposes, and such a cable comprises a flexible conduit in which a control wire is slidable to perform the desired function. In order for the relative movement of the control wire and the conduit to take place in a controlled manner for the reliable operation of, for example, a clutch or gearbox mechanism or throttle of a motor vehicle, it is necessary that each end of the conduit be anchored, for example to the body of a vehicle. In particular, the practice has developed of anchoring an end of the conduit to an opening in a bracket or bulkhead across which the control cable passes.

In general, such anchorage is achieved by means of a bracket or similar fixed member, having a generally U-shaped slot therein for receiving an abutment attached to a cable. The abutment is located in the slot of the bracket and fixed therein by some means so as to resist withdrawal of the abutment from the slot and also axial movement of the abutment relative to the slot. Conventional fixing means for this purpose have meant that the abutment must be presented to the bracket from a particular direction and orientation, so that corresponding elements of the fixing means on the abutment and the bracket are precisely located relative to each other. In addition, many conventional abutment arrangements tend to have a somewhat complex structure which is relatively difficult and time-consuming to assemble.

In particular in the motor industry, there is a constant requirement to simplify and speed up the vehicle assembly process and it is therefore an object of the present invention to provide apparatus for use in quickly, easily and reliably anchoring an elongate member to another member.

BRIEF SUMMARY OF THE INVENTION

In accordance with the present invention, there is provided an anchoring device which is suitable for anchoring an elongate member to a fixed member having a slot leading to an edge thereof, the anchoring device comprising a sleeve which is fixable coaxially around said elongate member and which is provided with a circumferential groove, the axial length of which is sufficient to accommodate the thickness of the fixed member at said slot, the outer diameter of the groove being less than the inner diameter of the slot, the anchoring device further comprising a collar member which is carried by, and axially moveable along, said sleeve, said collar member having a leading edge which extends into said groove when the anchoring device is located within said slot, to effectively increase the diameter of said groove and prevent said anchoring device from being withdrawn from said slot, the collar member being arranged such that the leading edge thereof can be withdrawn from the groove by moving the collar member along the sleeve in an axial direction away from the slot, so as to enable the anchoring device to be withdrawn from the slot, wherein the axial length of the peripheral groove is fixed.

In a preferred embodiment of the present invention, when said anchoring device is located within the slot, the leading edge of the collar member substantially fills the gap between the groove and the slot, said gap being created by the difference in their respective diameters.

The collar member is preferably substantially cylindrical and its leading edge is accordingly preferably substantially circular.

The slot is beneficially generally U-shaped and includes a narrowed neck portion, beneath which said leading edge of the collar member is engaged when the anchoring device is located within the slot. The leading edge beneficially includes a chamfer. The fixed member may also include at least one chamfer at the open edge thereof, the chamfer of the leading edge of the collar member and the at least one chamfer of the fixed member then preferably being arranged to cooperate with each other such that when the anchoring device is inserted in the slot, the fixed member chamfer operates to push the leading edge of the collar out of the groove and away from the fixed member.

The collar member is preferably spring biased in the direction of the fixed member, such that when the anchoring device is fully located within the slot, the leading edge of the collar member automatically extends into the groove. The collar member is then beneficially manually retractable against the spring force to withdraw the leading edge thereof from the groove, and enable the anchoring device to be withdrawn from the slot.

The anchoring device may include a load bearing ring surrounding at least a portion of the collar member. The device may further include a spring which is located underneath the collar member and is retained in compression by a cap member.

Another embodiment of the present invention is an anchoring device (10) for anchoring an elongate member to a fixed member (8), having a slot (20) leading to an edge thereof, the anchoring device comprising a sleeve (7) which is fixable coaxially around said elongate member and which is provided with a circumferential groove the axial length of which is sufficient to accommodate the thickness of the fixed member (8) at said slot (20), the outer diameter of the groove being less than the inner diameter of the slot (20), the anchoring device (10) further comprising a collar member (1) which is carried by, and axially moveable along, said sleeve, said collar member (1) having a leading edge (9) which extends into said groove when the anchoring device is located within said slot (20), to effectively increase the diameter of said groove and prevent said anchoring device from being withdrawn from said slot, the collar member (1) being arranged such that the leading edge (9) thereof can be withdrawn from the groove by moving the collar member along the sleeve in an axial direction away from the slot, so as to enable the anchoring device to be withdrawn from the slot.

BRIEF DESCRIPTION OF THE DRAWINGS

Embodiments of the present invention will now be described by way of example only and with reference to the accompanying drawings, in which.

DETAILED DESCRIPTION OF THE INVENTION

Figure 1:
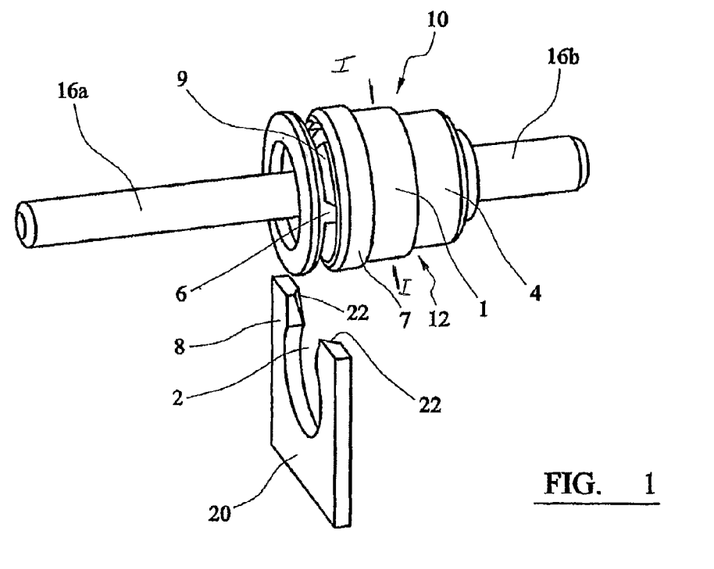
FIG. 1 is a perspective side view of an abutment according to an exemplary embodiment of the present invention.
Figure 2:
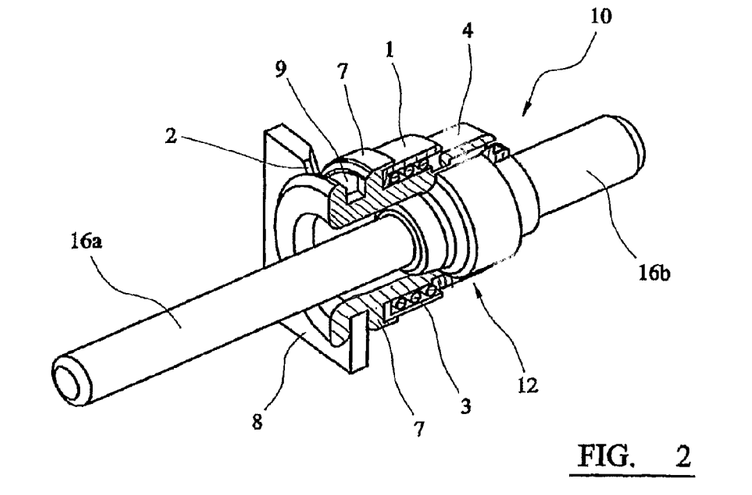
FIG. 2 is a perspective view of the abutment of FIG. 1, a portion thereof being cut-away (shown along the plane I) to illustrate the internal structure of the arrangement.
Figure 3:
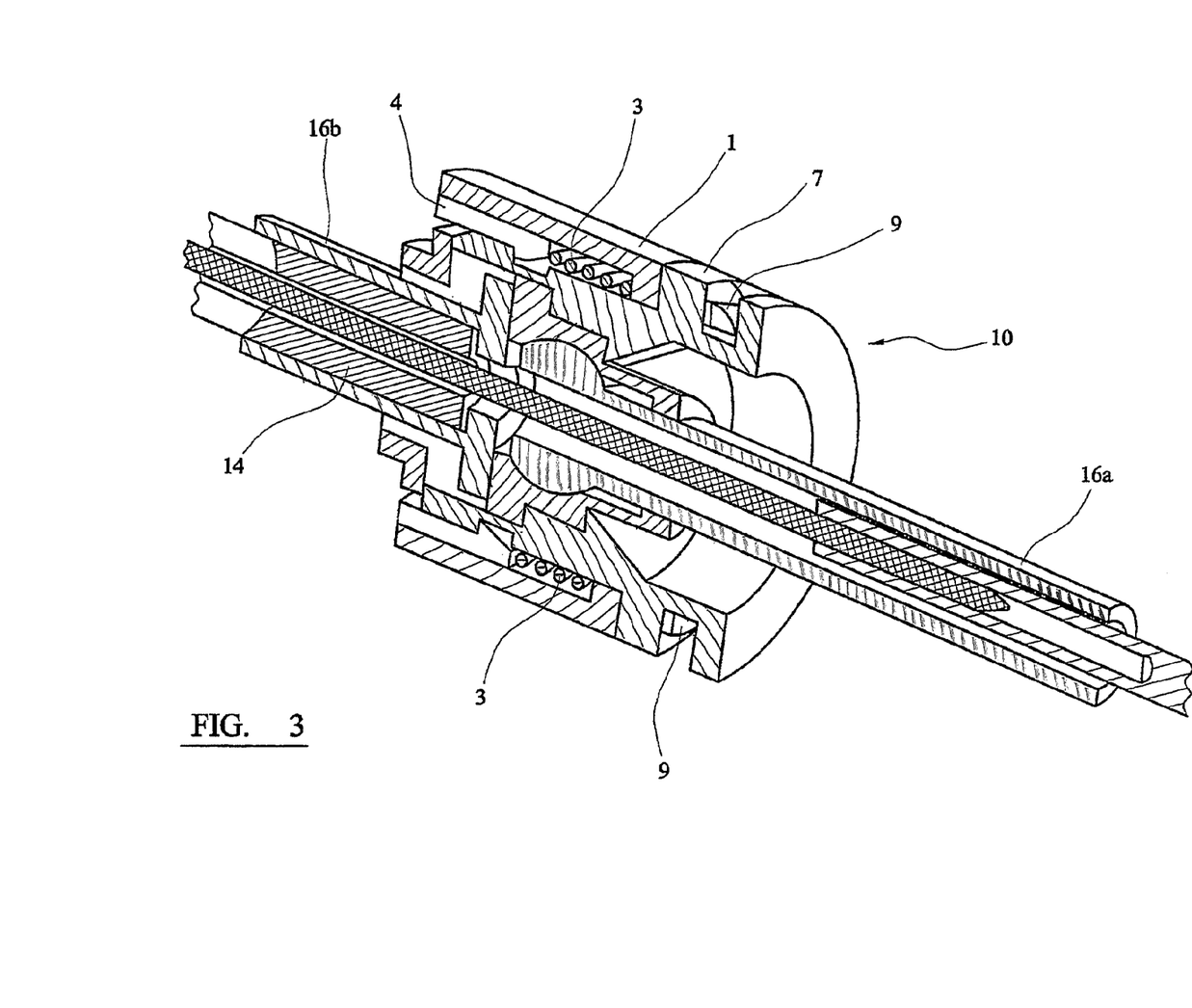
FIG. 3 is a schematic section (shown along the plane I) of the arrangement of FIG. 1.
Figures 4, 5, 6:
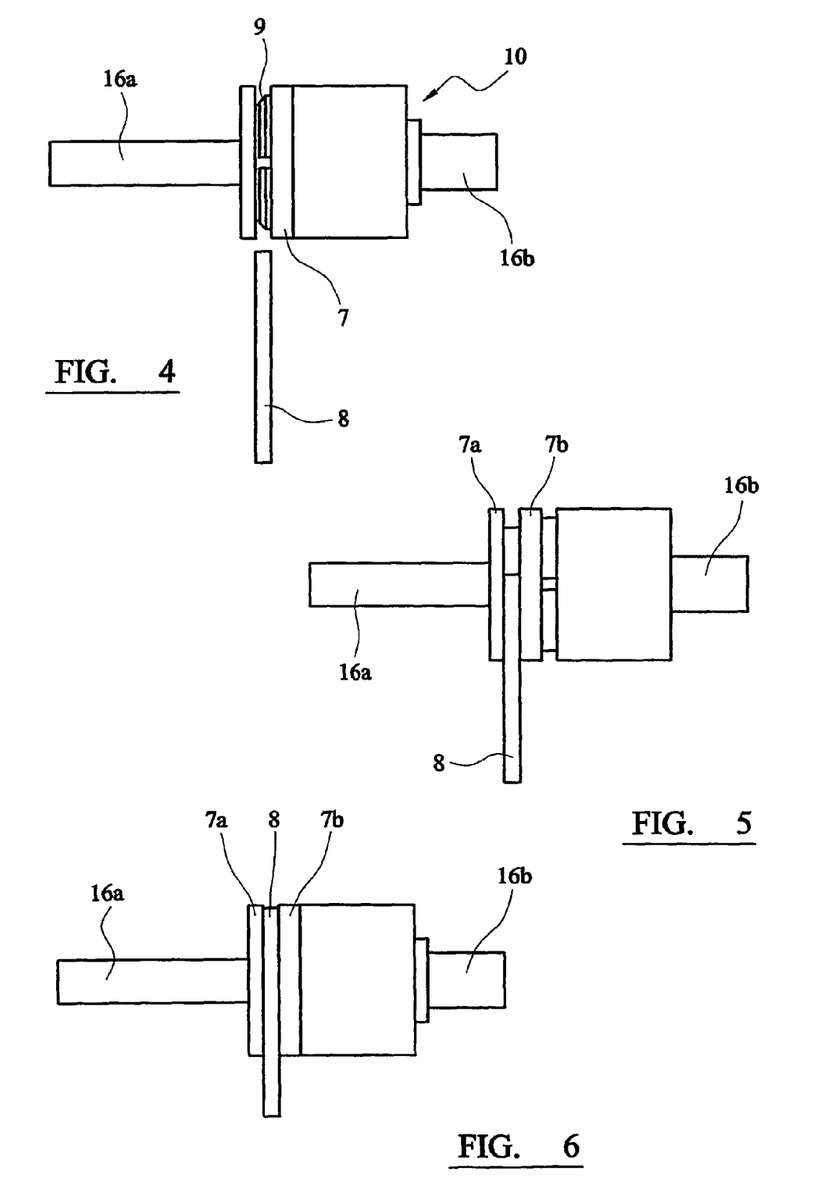
FIGS. 4 to 6 are schematic side views of an abutment according to an exemplary embodiment of the invention, at various stages of connection with the bracket.
Figure 7:
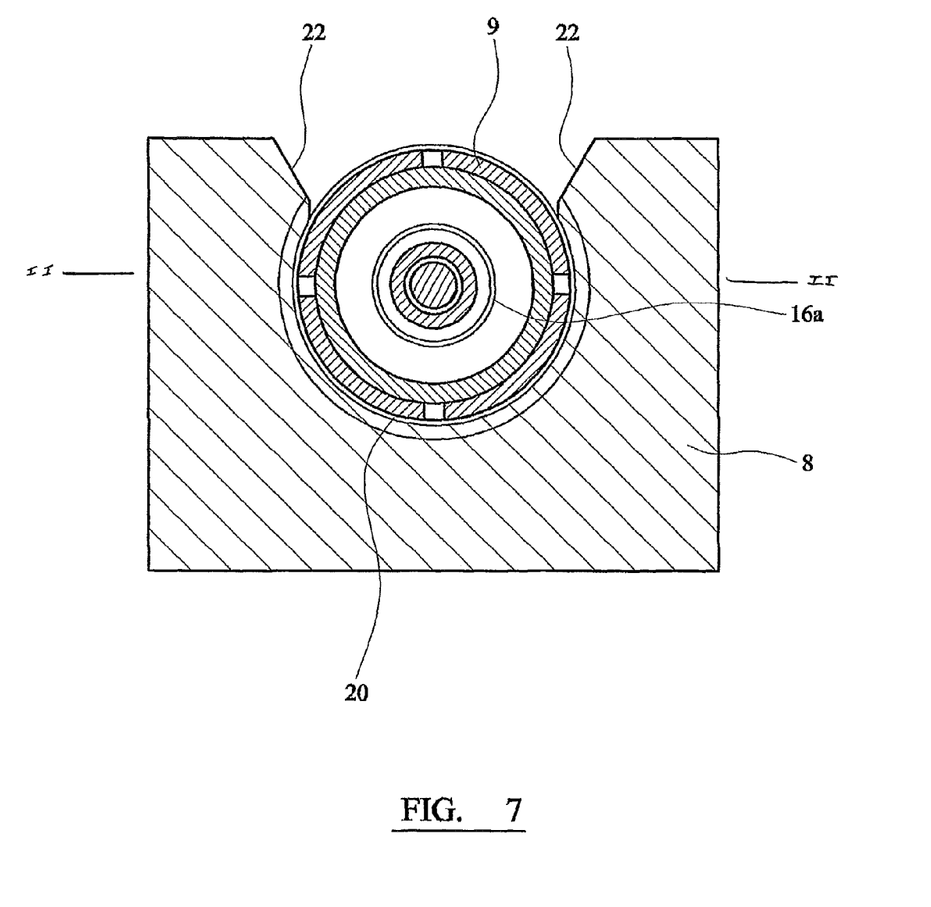
FIG. 7 is a schematic, cross-sectional front view (shown as II) of the abutment of FIGS. 4 to 6 when connected to the bracket.

Referring to FIGS. 1 to 3 of the drawings, an abutment for anchoring an elongate member, for example, the sheath of a flexible cable, also known as a "push-pull" cable, is generally indicated at 10. In particular, the abutment 10 comprises a generally cylindrical body 12 having an axial through-cavity 14 along which a sliding core (not shown) of the push-pull cable is normally disposed.

Two cylindrical tubular portions 16a, 16b of smaller diameter than the body 12 extend at opposite ends of the body 12. Portion 16a guides the sliding of the inner core cable and an end rod (which prevents buckling of the inner core cable between a fixing point for the outer cable (non-movable) and a fixing point for the inner cable (movable). Portion 16b is intended to fix the outer cable to the body 12.

The body 12 comprises a load bearing ring 7 defining two opposed shoulder portions 7a, 7b, the axial distance between which shoulder portions is fixed and defines an engagement portion of the abutment body 12. The abutment further comprises a spring loaded collar 1 having a chamfered end 9 including grooves 6 which allow it pass under the shoulder portion 7a of the load bearing ring 7 and into the engagement portion of abutment body 12. The spring 3 for operating the spring loaded collar 7 is located underneath the collar 1 and is retained in compression by a damper cap 4. As such, the spring force acts axially along the longitudinal axis of the body.

The abutment of this exemplary embodiment of the present invention is intended for use in anchoring a flexible cable to a bracket 8 defining a generally U-shaped seat 20. The upper edges of the bracket 8 are provided with a chamfered lead portion 22, the distance between the upper edges being less than the diameter of the seat 20 so as to define a neck 2. Further, the diameter of the engagement portion of the abutment is less than that of the U-shaped seat 20 of the bracket 8.

Referring in addition to FIGS. 4 to 7 of the drawings in use, when the abutment is presented to the bracket 8, the lead portions 22 of the bracket 8 picks up the corresponding chamfer 9 on the collar 1, causing the collar to slide backwards against the spring force and enabling the engagement portion of the abutment body to be located in the U-shaped seat 20 of the bracket 8. When the abutment is fully located in the seat 20, the spring 3 causes the collar 1 to be pushed toward the bracket, and the edge 9 of the collar 1 engages the bracket 8 under the neck 2. It will be appreciated that the collar 1 fills the space defined by the difference in diameters of the engagement portion of the abutment body and the seat 20 of the bracket 8.

The absence of a lead on the underside of the neck 2 in the bracket 8 means that the abutment remains firmly in place within the bracket 8. In order to remove the abutment from the bracket 8, the outside of the collar 1 is manually retracted against the spring force, thereby retracting the chamfered edge 9 of the collar 1 away from the seat 20 of the bracket 8 (and thus widening the opening) so as to enable the abutment to be withdrawn through the neck 2 of the bracket 8.

Figure 8:
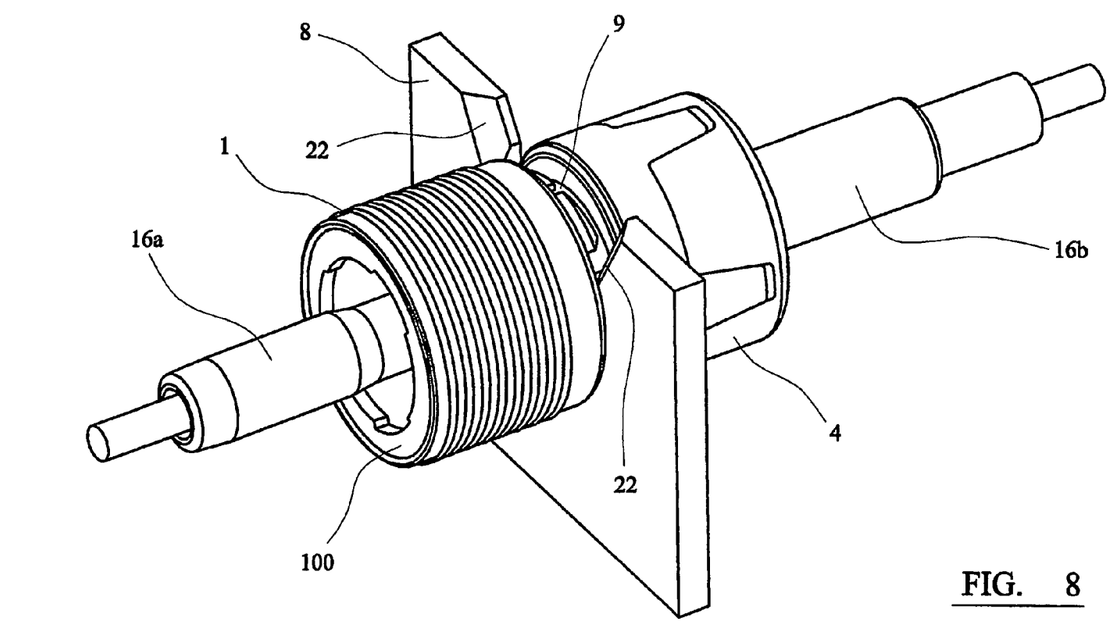
FIG. 8 is a perspective side view of an abutment according to another exemplary embodiment of the present invention.
Figure 9:
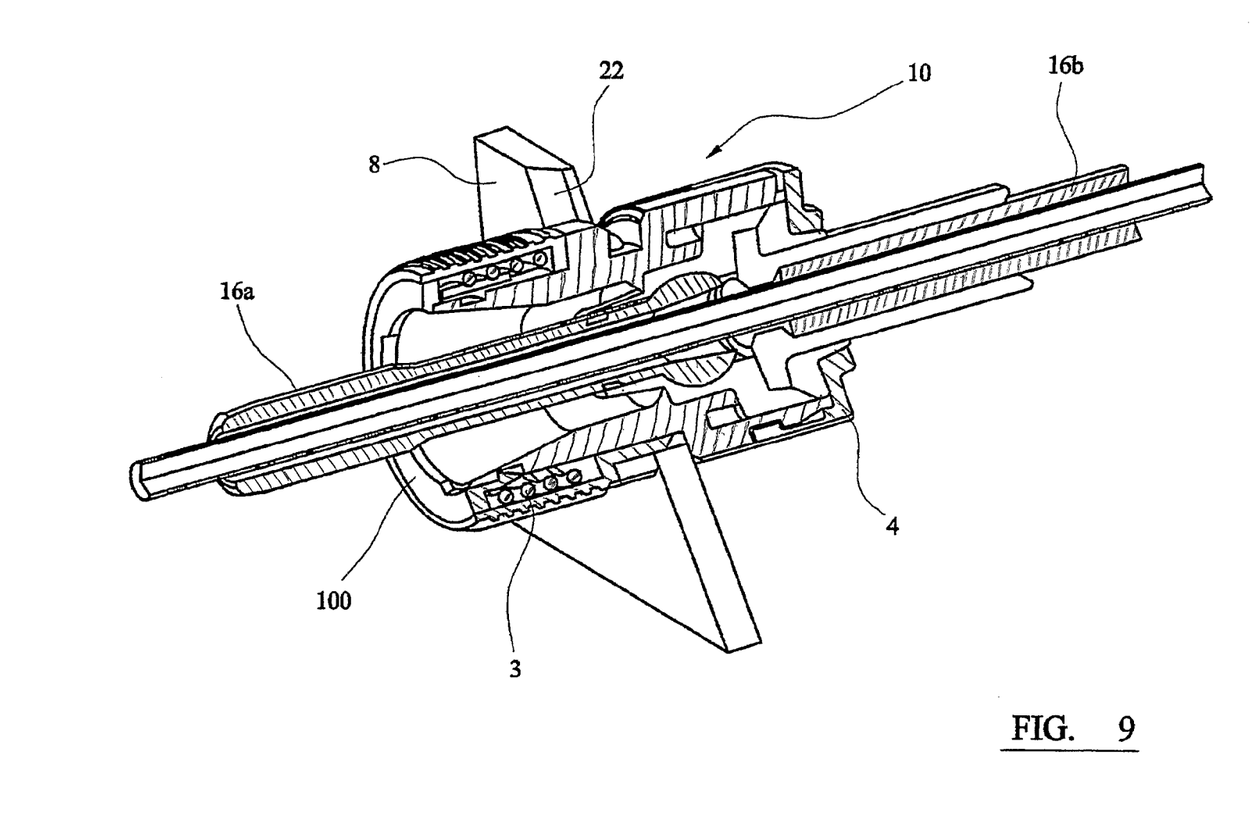
FIG. 9 is a perspective view of the abutment of FIG. 8, a portion thereof being cut-away to illustrate the internal structure of the arrangement.

Referring to FIGS. 8 and 9 of the drawings, an abutment 10 according to a second exemplary embodiment of the present invention is similar in many respects to that described above, and like features are denoted by the same reference numbers. However, in this case the direction of the locking mechanism 9 has changed from behind to in front of the bracket. This means that the spring 3 and the sliding collar 1 no longer have to be positioned diametrically over the damper cap 4, the diameter of which cannot be reduced due to strength and the size of the internal components. Because the damper cap 4 can no longer be used to retain the spring 3 in the assembly, a spring retaining clip 100 has been added to perform this function.

It will be appreciated that one of the main advantages of the abutment described above according to an exemplary embodiment of the present invention is its ability to be presented to the bracket from any angular orientation—there are no particular elements of the abutment and bracket which need to be matched or lined up. Further, the design achieves automatic firing, i.e. it automatically anchors itself within the bracket when it is fully located therein. The design provides positive location within the bracket, with an audible "click", so that an operative can be certain that the abutment has been correctly and completely located within the bracket. The abutment is easily removable from the bracket, and requires no re-arming before re-fitting. The arrangement also provides a clean external design.

A specific embodiment of an abutment according to the present invention has been described above by way of example only, and it will be appreciated by a person skilled in the art that modifications and variations can be made to the described embodiment without departing from the scope of the invention as defined by the appended claims.

The invention claimed is:

1. An anchoring device for anchoring an elongate member to a fixed member having a slot leading to an edge thereof, wherein the elongate member passes through the slot;

the anchoring device comprising a sleeve which is fixable coaxially around said elongate member and which is provided with a peripheral groove that has an axial length sufficient to accommodate the thickness of the fixed member at said slot and has an outer dimension being less than the inner dimension of the slot;

the anchoring device further comprising a collar member which is carried by, and axially moveable along, said sleeve, said collar member having a leading edge which extends into said groove and engages the edge of the slot when the anchoring device is located within said slot, the edge of the slot axially facing the collar member, the collar member being arranged such that the leading edge of the collar is withdrawn from the groove by moving the collar member along the sleeve in an axial direction away from the slot;

wherein the collar member is spring biased in the direction of the fixed member, such that when the anchoring device is fully located within the slot, the leading edge of the collar member automatically extends into the groove; and wherein said slot is generally U-shaped and includes a narrowed neck portion, beneath which said leading edge of the collar member is engaged with the edge of the slot when said anchoring device is located within said slot;

the anchoring device further comprising two opposed shoulders that define the peripheral groove, the opposed shoulders having a fixed axial distance between each other that remains fixed when the collar is moved along the sleeve in an axial direction.

2. An anchoring device according to claim 1, wherein, when said anchoring device is located within said slot, the leading edge of said collar member substantially fills a gap between the groove and the slot, said gap being created by a difference in their respective dimensions.

3. An anchoring device according to claim 1, wherein said collar member is substantially cylindrical and said leading edge is substantially circular.

4. An anchoring device according to claim 1, wherein said leading edge includes a chamfer.

5. An anchoring device according to claim 4, wherein said fixed member includes at least one chamfer at the edge of the slot, the chamfer of the leading edge of the collar member and the at least one chamfer of the fixed member being arranged to cooperate with each other such that when said anchoring device is inserted in said slot, the fixed member chamfer operates to push the leading edge of the collar out of the groove and away from the fixed member.

6. An anchoring device according to claim 1, wherein said collar member is manually retractable against the spring force to withdraw the leading edge thereof from the groove, and enable the anchoring device to be withdrawn from the slot.

7. An anchoring device according to claim 1, including a load bearing ring surrounding at least a portion of said collar member.

8. An anchoring device according to claim 1, including a spring located underneath said collar member and retained in compression by a cap member.

9. An anchoring device according to claim 2, wherein said collar member is substantially cylindrical and said leading edge is substantially circular.

10. An anchoring device according to claim 2, wherein said leading edge includes a chamfer.

11. An anchoring device according to claim 1, wherein said leading edge includes a chamfer.

12. An anchoring device according to claim 2, including a load bearing ring surrounding at least a portion of said collar member.

* * * * *